United States Patent
Field et al.

(10) Patent No.: US 10,704,599 B2
(45) Date of Patent: Jul. 7, 2020

(54) BALANCED SWITCHING AMPLIFIER FOR A MAGNETIC BEARING ASSEMBLY

(71) Applicant: Synchrony, Inc., Salem, VA (US)

(72) Inventors: Robert Jett Field, Fincastle, VA (US); Kirk J. Treubert, Roanoke, VA (US)

(73) Assignee: Synchrony, Inc., Salem, VA (US)

( * ) Notice: Subject to any disclaimer, the term of this patent is extended or adjusted under 35 U.S.C. 154(b) by 0 days.

(21) Appl. No.: 16/461,872

(22) PCT Filed: Oct. 23, 2017

(86) PCT No.: PCT/US2017/057828
§ 371 (c)(1),
(2) Date: May 17, 2019

(87) PCT Pub. No.: WO2018/102048
PCT Pub. Date: Jun. 7, 2018

(65) Prior Publication Data
US 2019/0353203 A1    Nov. 21, 2019

Related U.S. Application Data

(60) Provisional application No. 62/428,077, filed on Nov. 30, 2016.

(51) Int. Cl.
*F16C 32/04*    (2006.01)

(52) U.S. Cl.
CPC ...... *F16C 32/0446* (2013.01); *F16C 32/0444* (2013.01); *F16C 32/0457* (2013.01)

(58) Field of Classification Search
CPC ............ F16C 32/0448; F16C 32/0457; F16C 32/0451; F16C 32/0446; F16C 32/0444;
(Continued)

(56) References Cited

U.S. PATENT DOCUMENTS 5,262,692 A * 11/1993 Williams ............ F16C 32/0457
310/90.5
5,291,115 A * 3/1994 Ehsani .................. H02P 25/089
318/400.4

(Continued)

FOREIGN PATENT DOCUMENTS

| EP | 0989315 | * | 3/2000 | ............. F16C 39/06 |
| JP | 108145056 A | | 6/1996 | |
| KR | 101385977 B1 | | 4/2014 | |

OTHER PUBLICATIONS

J.Zhang "Power Amplifier for Active Magnetic Bearings", Dissertation submitted to Swiss Federal Institute of Technology, Zurich, CH, pp. 50-87, 1995. (Year: 1995).*

(Continued)

*Primary Examiner* — Burton S Mullins
(74) *Attorney, Agent, or Firm* — Fletcher Yoder, P.C.

(57) ABSTRACT

A balanced switching amplifier for a magnetic bearing assembly may include a first switching amplifier configured to drive a first load of an electromagnet of the magnetic bearing assembly via a first plurality of lead wires. The balanced switching amplifier may also include a second switching amplifier configured to drive a second load of the electromagnet via a second plurality of lead wires. The first switching amplifier and the second switching amplifier may be configured to operate in tandem such that respective voltages in the first plurality of lead wires and the second plurality of lead wires substantially neutralize one another, thereby reducing electromagnetic emissions from each of the first plurality of lead wires and the second plurality of lead wires.

18 Claims, 4 Drawing Sheets

(58) Field of Classification Search
CPC ......... F16C 32/04; F16C 32/044; H02K 7/09; H02P 7/04
USPC ...................................................... 310/90.5
See application file for complete search history.

(56) References Cited

U.S. PATENT DOCUMENTS

| | | | | |
|---|---|---|---|---|
| 5,627,421 | A * | 5/1997 | Miller | F16C 32/0457 310/51 |
| 6,005,316 | A * | 12/1999 | Harris | F16C 32/0457 310/90.5 |
| 6,278,251 | B1 * | 8/2001 | Schob | F16C 32/0457 318/293 |
| 6,794,777 | B1 | 9/2004 | Fradella | |
| 6,949,853 | B2 * | 9/2005 | Kawashima | F04D 19/048 310/90.5 |
| 7,091,641 | B2 * | 8/2006 | Kawashima | F04D 19/048 310/90.5 |
| 7,830,056 | B2 * | 11/2010 | Barada | F16C 32/0448 310/90.5 |
| 7,944,104 | B2 * | 5/2011 | Barada | F16C 32/0448 310/90.5 |
| 8,018,106 | B2 * | 9/2011 | Buhler | F16C 32/0457 310/68 B |
| 9,739,308 | B2 * | 8/2017 | Liu | F16C 32/0446 |
| 2007/0278987 | A1 * | 12/2007 | Bartholet | F16C 32/0457 318/800 |

OTHER PUBLICATIONS

S. Liu et al. "Study of switching Power Amplifier for Active Magnetic Bearing", The 4th International Power Electronics and Motion Control Conference, 2004. IPEMC 2004, pp. 1539-1543. (Year: 2004).*

Zhang et al. "IGBT power amplifiers for active magnetic bearings of high speed milling spindles" Proceedings of IECON '95—21st Annual Conference on IEEE Industrial Electronics Industrial Electronics, Control, and Instrumentation, 1995 (Year: 1995).*

International Search Report and Written Opinion dated Feb. 22, 2018 corresponding to PCT Application No. PCT/US2017/057828 filed Oct. 23, 2017.

* cited by examiner

| STATE | 212a | 212b | OUTPUT V | V AT 210a | V AT 210b |
|---|---|---|---|---|---|
| STATE 1 | ON | ON | +VLINK-2V | +VLINK/2-1V | -VLINK/2+1V |
| STATE 2 | ON | OFF | -2V | +VLINK/2-1V | +VLINK/2+1V |
| STATE 3 | OFF | ON | -2V | -VLINK/2-1V | -VLINK/2+1V |
| STATE 4 | OFF | OFF | -VLINK-2V | -VLINK/2-1V | +VLINK/2+1V |

| STATE | 214a | 214b | OUTPUT V | V AT 210d | V AT 210c |
|---|---|---|---|---|---|
| STATE 1 | ON | ON | +VLINK-2V | +VLINK/2-1V | -VLINK/2+1V |
| STATE 2 | ON | OFF | -2V | +VLINK/2-1V | +VLINK/2+1V |
| STATE 3 | OFF | ON | -2V | -VLINK/2-1V | -VLINK/2+1V |
| STATE 4 | OFF | OFF | -VLINK-2V | -VLINK/2-1V | +VLINK/2+1V |

BALANCED SWITCHING AMPLIFIER FOR A MAGNETIC BEARING ASSEMBLY

BACKGROUND

Magnetic bearings are used in different rotating machines such as electric motors, compressors, turbines, generators, and the like in order to maintain the axial and/or radial positions of a rotating shaft by means of magnetic fields acting on a rotor affixed to the rotating shaft of the rotating machine. Typically, an individual magnetic bearing may include multiple electromagnets disposed about the rotor and utilized to "pull" the rotor in the appropriate direction to maintain the axial and/or radial positions of the rotating shaft. Generally, each electromagnet may include a coil at least partially surrounding a ferromagnetic core. Positive and negative voltages from a power source may be applied to any coil to drive the magnetic flux density up or down and to account for parasitic voltage drops such as cable and coil resistance.

The force exerted by an electromagnet is $F=(B^2A)/(2u_0)$ where B is the magnetic flux density, A is the magnet area, and $u_0$ is the permeability of free space. It should be noted that force is proportional to the square of the flux density for a single electromagnet. The flux density is changed by the application of voltage to the electromagnet coil for a period of time according to Faraday's law, $d(BA)/dt=-V_B/N$ where $V_B$ is the voltage applied to change the flux density, t is time, and N is number of wire turns on the coil. Additional voltage must be applied to the coil to overcome the voltage drop due to resistance, $V_R=IR$, where $V_R$ is the voltage of the resistive drop, I is the coil current, and R is the total resistance of the coil and cable coupled thereto. The total voltage applied by the amplifier is $V=V_R+V_B$. This is best understood by saying that any amplifier voltage not used for the IR drop will be used for changing the flux density, or $V_B=V-V_R$.

Accordingly, switching amplifiers may be used in magnetic bearings to apply the voltages from the power source to the coils via one or more cables. Generally, switching amplifiers use switching devices, such as transistors, operated as electronic switches capable of alternating between conductive and nonconductive states. In general, switching amplifiers repeatedly and independently connect lead wires of the electromagnet coil to the positive or negative side of the power source. Switching amplifiers may be highly efficient since the transistors utilized therein are typically either fully on (saturated) or fully off, which minimizes power losses in the transistors. However, although efficient, switching amplifiers may be subject to certain drawbacks, one of which is electromagnetic interference (EMI). EMI may occur when the lead wires of the coil are switched between the positive and negative voltages of the power source at the switching frequency, thereby causing the lead wires to act as an antenna radiating EMI at harmonics of the switching frequency. Switching amplifiers have characteristic rapid change of voltage in a short time that puts significant high-frequency voltages onto the cable. Furthermore the coil lead wires, having self-inductance and stray capacitance between them, may act as transmission lines, causing the cable to resonate at high frequency following every switching event. This resonance may produce voltage transients at the coils that stress the electromagnet coil insulation. The cable resonance may also be an additional source of EMI. EMI can be increased by operating multiple switching amplifiers for multiple coils, especially if the switching amplifiers are synchronized. EMI can also be increased on longer cables due to more resonance and larger emitting length.

One conventional approach to reduce the EMI radiated by the lead wires includes placing the lead wires in one or more shielded cables. While EMI may be reduced by placing the lead wires in a shielded cable, this approach results in additional drawbacks. For example, the cable resonance may be increased due to the added capacitance between the lead wires and ground (shield). In addition, the shielded cable has capacitive coupling to the lead wires, and a slightly inductive return path to ground. As a result, the shield tends to pick voltages from the lead wires, especially when switching is synchronized, and especially at locations far away from where the shield is tied to ground, both at harmonics of the switching frequency and at the cable resonant frequency. Thus even a shielded cable may be a source of radiated EMI.

What is needed, then, is a switching amplifier capable of supplying voltages to magnetic bearings while reducing EMI caused by switching voltages and cable resonances.

SUMMARY

Embodiments of the disclosure may provide a balanced switching amplifier for a magnetic bearing assembly. The balanced switching amplifier may include a voltage link configured to receive a voltage from a power source, and a first switching amplifier configured to drive a first load of an electromagnet of the magnetic bearing assembly via a first plurality of lead wires. The first switching amplifier may include a first switch electrically coupled to a positive voltage side of the voltage link, and a second switch electrically coupled to a negative voltage side of the voltage link. The first switch and the second switch may be configured to output four distinct output states for the first switching amplifier. The balanced switching amplifier may also include a second switching amplifier configured to drive a second load of the electromagnet via a second plurality of lead wires. The second switching amplifier may include a third switch electrically coupled to the positive voltage side of the voltage link, and a fourth switch electrically coupled to the negative voltage side of the voltage link. The third switch and the fourth switch may be configured to output four distinct output states for the second switching amplifier. The first switching amplifier and the second switching amplifier may be configured to operate in tandem such that respective voltages in the first plurality of lead wires and the second plurality of lead wires substantially neutralize one another, thereby reducing electromagnetic emissions from each of the first plurality of lead wires and the second plurality of lead wires.

Embodiments of the disclosure may further provide a magnetic bearing assembly for a rotating machine. The magnetic bearing assembly may include a rotor configured to rotate with a rotary shaft of the rotating machine, and a plurality of electromagnets disposed about the rotor, each electromagnet including a first coil and a second coil spaced from the first coil. The magnetic bearing assembly may also include a plurality of balanced switching amplifiers, each balanced switching amplifier electrically coupled to a respective electromagnet via four lead wires. Two lead wires of the four lead wires may be electrically coupled to the first coil and two other lead wires of the four lead wires may be electrically coupled to the second coil. The magnetic bearing assembly may further include a plurality of sensors configured to measure at least one of an axial position and a radial position of the rotor. Each sensor may be further configured to generate and transmit an input signal including information related to a measured position of the rotor. The magnetic bearing assembly may also include a controller configured to receive the respective input signal from each of the sensors, compare the respective received input signal with a first reference signal and a second reference signal, generate a first output signal and a second output signal based on a comparison of the respective received input signal with the first reference signal and the second reference signal, and transmit the first output signal and the second output signal to the respective balanced switching amplifier of the plurality of balanced switching amplifiers. The magnetic bearing assembly may further include a power source electrically coupled to and configured to power at least the plurality of balanced switching amplifiers.

Embodiments of the disclosure may further provide a magnetic bearing assembly for a rotating machine. The magnetic bearing assembly may include a rotor configured to rotate with a rotary shaft of the rotating machine, and a plurality of electromagnets disposed about the rotor and including a first electromagnet including a first coil and a second electromagnet radially opposing the first electromagnet and including a second coil. The magnetic bearing assembly may also include a plurality of switching amplifiers configured to operate in synchrony with one another. The plurality of switching amplifiers may include a first switching amplifier electrically coupled to the first coil of the first electromagnet via two lead wires, and a second switching amplifier electrically coupled to the second coil of the second electromagnet via two other lead wires. The magnetic bearing assembly may further include a plurality of sensors configured to measure at least one of an axial position and a radial position of the rotor, each sensor further configured to generate and transmit an input signal including information related to a measured position of the rotor. The magnetic bearing assembly may also include a controller configured to receive the respective input signal from each of the sensors, compare the respective received input signal with a first reference signal and a second reference signal, generate a first output signal and a second output signal based on a comparison of the respective received input signal with the first reference signal and the second reference signal, and transmit the first output signal to the first switching amplifier and the second output signal to the second switching amplifier of the plurality of switching amplifiers. The magnetic bearing assembly may further include a power source electrically coupled to and configured to power at least the plurality of switching amplifiers.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 1:
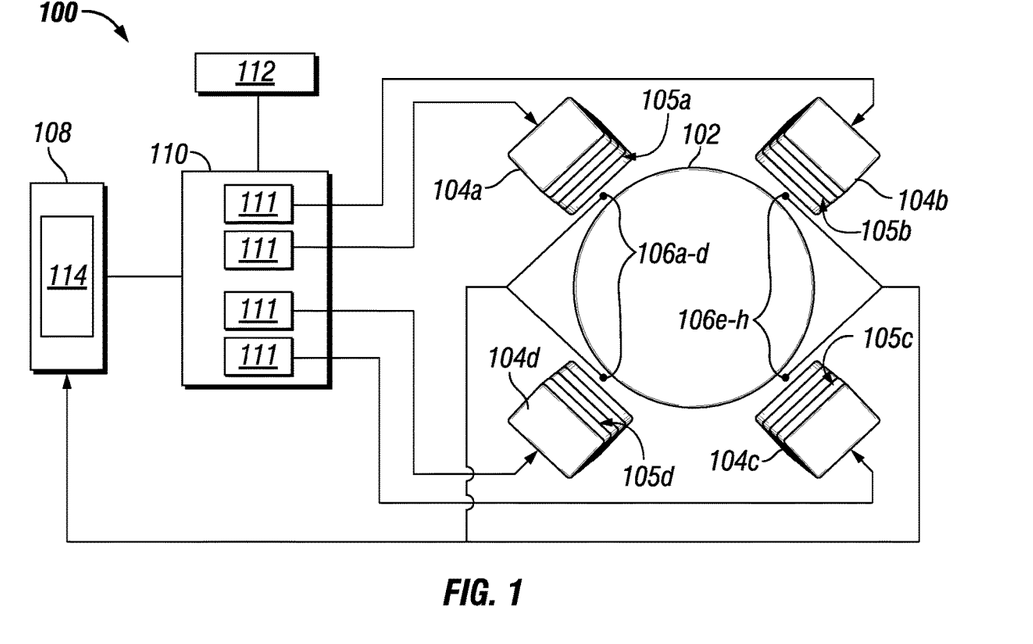
FIG. 1 illustrates a schematic of a radial magnetic bearing assembly for a rotating machine, according to one or more embodiments of the disclosure.

FIG. 1 illustrates a schematic of a radial magnetic bearing assembly 100 for a rotating machine, according to one or more embodiments of the disclosure. The rotating machine (not shown) may be or include, but is not limited to, an electric motor, a compressor, a turbine, a generator, and the like. The rotating machine may include a rotary shaft (not shown) configured to rotate therein and may provide, in some cases (e.g., a turbine), mechanical energy to other process equipment. The rotating machine may include additional radial magnetic bearings (not shown) at different locations on the rotary shaft, and may include one or more axial (thrust) magnetic bearings (not shown) for control of the axial position of the rotary shaft. The radial magnetic bearing assembly 100 may be configured to support the rotating shaft within the rotating machine by means of magnetic fields acting on a rotor 102 affixed to the rotating shaft of the rotating machine.

To that end, the magnetic fields acting on the rotor 102 may be generated by a plurality of electromagnets 104a-d coupled to or otherwise mounted to a stator (not shown) of the radial magnetic bearing assembly 100. In an exemplary embodiment, the radial magnetic bearing assembly 100 may include four or more electromagnets (four are shown 104a, 104b, 104c, and 104d) configured to maintain radial positions of the rotating shaft by means of magnetic fields acting on the rotor 102 affixed to the rotating shaft and rotating within the stator of the magnetic bearing assembly 100. The electromagnets 104a-d may be arranged equiangularly about the rotor 102 and may operate in pairs 104a, 104c and 104b, 104d on opposing sides of the rotor 102. It shall be appreciated that the radial magnetic bearing assembly 100 may include any number of electromagnets 104a-d arranged in any suitable configuration.

The force exerted by each electromagnet 104a-d to "pull" the rotor 102 in any particular direction to maintain the appropriate position of the rotary shaft is proportional to the square of the magnetic flux density. As arranged, in one aspect of operation, each electromagnet of the pair of electromagnets 104a, 104c or 104b, 104d may be at half of the maximum magnetic flux density for zero net force. Accordingly, in another aspect of operation, non-zero net force on the rotor 102 may be created by increasing the magnetic flux density by "delta" on one electromagnet of the pair of electromagnets 104a, 104c or 104b, 104d, and reducing the magnetic flux density by delta on the other electromagnet of the pair of electromagnets 104a, 104c or 104b, 104d. As operated in this manner, the force may be "linearized", or in other words, the net force from the pair of electromagnets 104a, 104c or 104b, 104d is proportional to the delta magnetic flux. Magnetic flux density may be changed by applying voltages to respective coils 105a-d of any of the electromagnets 104a-d, with the change in magnetic flux density proportional to voltage multiplied by time. Therefore, paired coils 105a, 105c or 105b, 105d of opposing electromagnets 104a, 104c or 104b, 104d may receive opposite voltages (positive and negative) to drive magnetic flux density up with respect to one electromagnet 104a or 104b and down on the opposing paired electromagnet 104c or 104d.

The radial magnetic bearing assembly 100 may include an amplifier array 110 including a plurality of switching amplifiers 111 to drive the coils 105a-d of the electromagnets 104a-d. The radial magnetic bearing assembly 100 may also include a plurality of position sensors 106a-h, which sense the position of the rotor 102. The radial magnetic bearing assembly 100 may also include a controller 108, which processes the sensor signals and commands switching amplifier current or voltage. The controller 108 may include one or more processors 114 to process the sensor signals. The radial magnetic bearing assembly 100 may also include a power source 112 configured to power one or more components of the magnetic bearing assembly 100. In one embodiment, the power source 112 may provide DC voltage to the amplifier array 110.

The sensors 106a-h may be configured to measure axial and/or radial positions of the rotor 102 or a target associated therewith with respect to the electromagnets 104a-d. The target may be the outer surface of the rotor 102 or rotary shaft, a feature of the outer surface of the rotor 102 or rotary shaft, or any component coupled to or integral with the rotor 102 or rotary shaft capable of providing a reference point for the plurality of sensors 106a-h. In one embodiment, one or more of the plurality of sensors 106a-h may rely on eddy currents. In other embodiments, one or more of the plurality of sensors 106a-h may be inductive sensors, optical sensors, infrared sensors, ultrasonic sensors, or any other type of sensor capable of being integrated with the controller 108 to determine the axial and/or radial position of the rotor 102 or rotary shaft. Some embodiments may also use a combination of different types of sensors 106a-h to determine the axial and/or radial position of the rotor 102 or rotary shaft.

Figure 2:
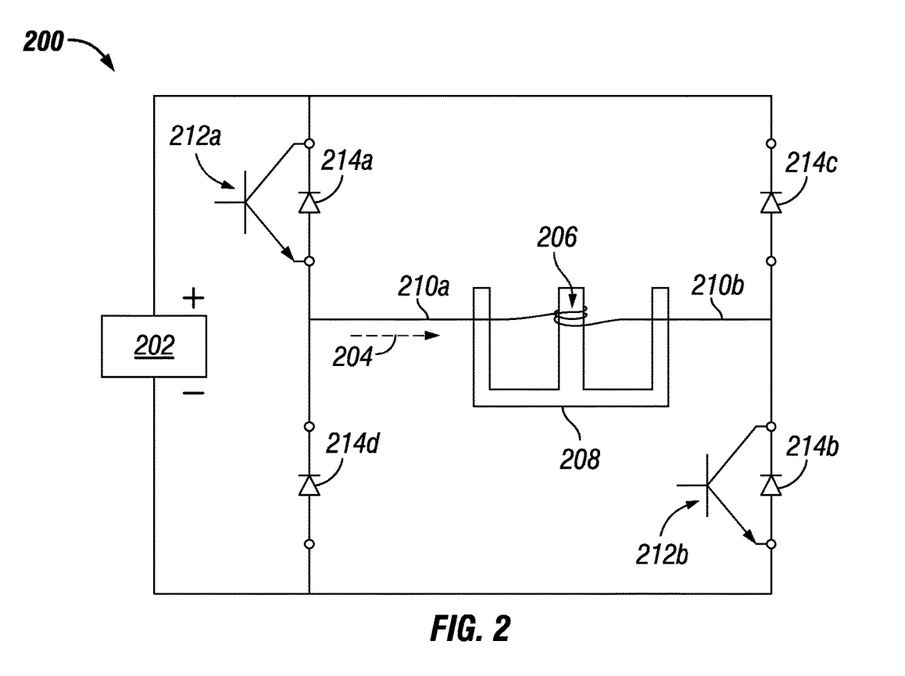
FIG. 2 illustrates a schematic diagram of a switching amplifier, which may be utilized in the radial magnetic bearing assembly of FIG. 1, according to one or more embodiments.

Referring now to FIG. 2 with continued reference to FIG. 1, FIG. 2 illustrates a schematic diagram of a switching amplifier 200, which may be utilized as one or more of the switching amplifiers 111 in the amplifier array 110 of FIG. 1. The amplifier array 110 may include four switching amplifiers 200. Each switching amplifier 200 may be electrically coupled to a respective electromagnet 104a-d of the radial magnetic bearing assembly 100 as provided herein. A voltage link 202 including a positive voltage link and a negative voltage link is illustrated in FIG. 2 and may be indicative of DC voltage provided by the power source 112 to the amplifier array 110, and correspondingly, to each of the switching amplifiers 200. It should be noted that the switching amplifier 200 produces positive currents (indicated by arrow 204) through coil 206 wound around magnetic core 208, which varies the magnetic flux from zero to maximum. Lead wires 210a and 210b of the coil 206 may couple the coil 206 to the voltage link 202 and/or the power source 112 and may be shielded in one or more cables (not shown).

In one or more embodiments, the switching amplifier 200 may include transistors 212a and 212b and diodes 214a-d, as arranged in FIG. 2. Each of the transistors 212a and 212b may be NPN transistors; however, in other embodiments, the transistors 212a and 212b may be MOSFET or IGBT transformers. The transistors 212a, 212b of the switching amplifier 200 may be driven by output signals, e.g., pulse width modulation (PWM) signals, generated by the controller 108. The controller 108 may be an analog controller or a digital controller. In at least one embodiment, a digital processor 114 of the controller 108 may be or may include a field programmable gate array (FPGA) generating two PWM signals for each switching amplifier 200, where the FPGA provides a PWM signal PWM1A to the transistor 212a and another PWM signal PWM2A to the transistor 212b of the switching amplifier 200 in FIG. 2. The PWM signals PWM1A and PWM2A may be synchronized with one another.

Figure 3:
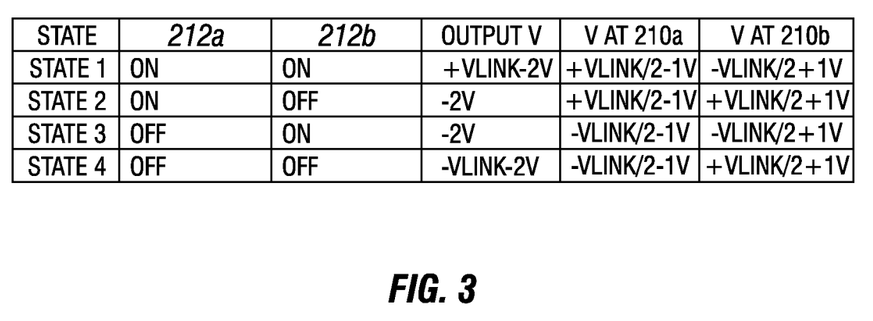
FIG. 3 is a table of the output states of the switching amplifier of FIG. 2, according to one or more embodiments.

Referring now to FIG. 3 with continued reference to FIG. 2, FIG. 3 is a table of the output states of the switching amplifier 200 of FIG. 2. As shown, there are four switching states for the switching amplifier 200. These switching states are defined by which combination of the two transistors 212a and 212b are turned on or off, as directed by the PWM signals PWM1A and PWM2A. STATE 1 in FIG. 3 may be referred to as the positive state since STATE 1 applies positive voltage to the coil 206, thereby increasing magnetic flux density. STATE 4 in FIG. 3 may be referred to as the negative state since STATE 4 applies negative voltage, thereby decreasing magnetic flux density. Note that this switching amplifier 200 relies on the inductance of the coil 206 to achieve the negative voltage of STATE 4, which may occur while current 204 is flowing in the coil 206. In FIG. 3, STATE 2 and STATE 3 may be referred to as coasting states since these states apply almost no voltage to the coil 206, keeping the flux density almost unchanged. Amongst the aforementioned four states, the instantaneous output voltage of the switching amplifier 200 may be one of the three voltages defined in FIG. 3, +VLINK−2V, −2V, or −VLINK−2V. However, any positive voltage up to +VLINK−2V may be achieved by time-proportioned switching between STATE 1, STATE 2, and STATE 3. An exemplary switching pattern for positive output voltages, which equalizes heating (on-time) of the transistors 212a and 212b, is one period of STATE 1 switching to STATE 2, followed by a second period of STATE 1 switching to STATE 3, then repeating. A longer proportion of STATE 1 in each switching period results in a higher net output voltage for the period. Any negative voltage down to ~VLINK~2V may be achieved by time-proportioned switching between STATE 4, STATE 2, and STATE 3. An exemplary switching pattern for negative output voltages, which equalizes heating (on-time) of the transistors 212a and 212b, is one period of STATE 4 switching to STATE 2, followed by a second period of STATE 4 switching to STATE 3, then repeating. A longer proportion of STATE 4 in each switching period results in a more negative net output voltage for the period. Thus the switching amplifier output voltage may be anywhere on a continuous range from −VLINK−2V to VLINK−2V. Generally, the switching amplifier 200 may output high voltage when it is desired to achieve a high magnetic flux slew rate, that is, when the magnetic force must be driven up or down quickly. In fact, the electromagnets 104a-d may be designed so that the maximum required dynamic flux slew rate corresponds to the maximum available voltage of +/−VLINK. However, under normal circumstances, the electromagnets 104a-d operate at a much lower flux slew rate and thus a much lower voltage is provided from the switching amplifiers 200. Thus, the switching amplifier 200 may predominantly operate in coasting states STATE 2 and STATE 3, with relatively little time in high-voltage states (STATE 1 or STATE 4).

In addition to the foregoing, FIG. 3 lists the voltages of the two lead wires 210a and 210b for the coil 206, with respect to ground. It should be recognized that the voltage link 202 may be floating with respect to ground, and so the relationship between the voltage link and ground may not absolutely be defined. However, for clarification purposes, it is convenient to assume that ground is at the midpoint of the link voltage source, and so the lead wire voltages in the various states of FIG. 3 have been calculated accordingly. As shown in FIG. 3, in STATE 1 and STATE 4 one lead wire 210a or 210b to the coil 206 is high, and one wire is low, with an average of 0. However, in STATE 3, both of the lead wires 210a and 210b are low, while in STATE 2 both of the lead wires 210a and 210b are high. The switching amplifier 200 is "unbalanced" in the sense that the average voltage on the lead wires 210a and 210b differs between the output states, which means switching between the states changes the net voltage coupling from the lead wires 210a and 210b to the cable shield (not shown), which may lead to EMI.

Accordingly, in an embodiment, a method of creating a balanced switching amplifier is to operate switching amplifier 200 only in STATE 1 and STATE 4, switching back and forth between STATE 1 and STATE 4, and eliminating the coasting states STATE 2 and STATE 3. Time proportioning between STATE 1 and STATE 4 may give any net output voltage between −VLINK−2V and +VLINK−2V. Both of STATE 1 and STATE 4 may have one of the lead wires 210a or 210b high and one lead wire low. The transistors 212a and 212b may switch on and off together to avoid STATE 2 and STATE 3. Accordingly, there is no net voltage coupling to the cable shield (not shown), and this may greatly reduce EMI. However, operating switching amplifier 200 only in STATE 1 and STATE 4 may presents a practical problem for the radial magnetic bearing system 100. In switching between high positive and negative output voltages, there is a high ripple current on the respective coils 206 at the switching frequency. This is especially true because the coils 206 are typically designed with a relatively low inductance to allow for rapid slew rate of the magnetic flux with the maximum available voltage +/−VLINK. Alternating between the maximum positive and negative voltages puts a high flux ripple on the electromagnets 104a-d, causing high force oscillations at the switching frequency. As a result, there may be high levels of vibration and acoustic noise, as well as problematic ripple current on the capacitors (not shown) in the voltage link 202. Therefore, it may be advantageous to minimize ripple current and minimize magnetic flux ripple by utilizing the coasting states STATE 2 and STATE 3 when possible.

Figure 4:
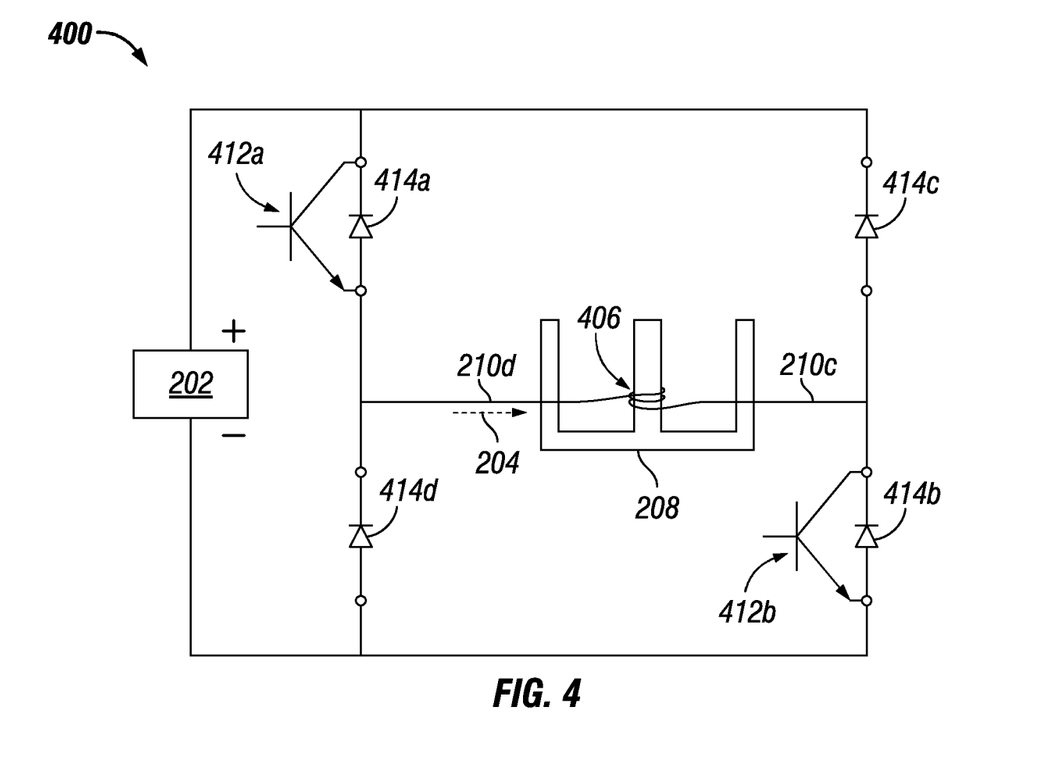
FIG. 4 illustrates a schematic diagram of another switching amplifier, which may be utilized in the radial magnetic bearing assembly of FIG. 1, according to one or more embodiments.
Figure 5:
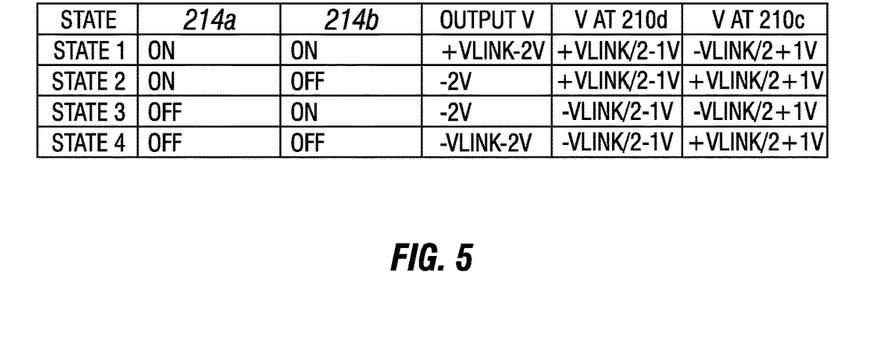
FIG. 5 is a table of the output states of the switching amplifier of FIG. 4, according to one or more embodiments.

In another embodiment, a method of balancing the amplifier outputs with respect to the cable shield may include adding a second switching amplifier and coil to the same cable. FIG. 4 shows a second switching amplifier 400, of similar construction to amplifier 200 of FIG. 2. FIG. 5 is a table of the output states of the switching amplifier of FIG. 4, according to one or more embodiments. Switching amplifier 400 may be connected to a second magnet coil 406 via lead wires 210c and 210d. All four lead wires 210a-d run in the same shielded cable (not shown), and each lead wire has an equal capacitance to the cable shield. In one or more embodiments, the switching amplifier 400 may include transistors 412a and 412b and diodes 414a-d, as arranged in FIG. 4. Each of the transistors 412a and 412b may be NPN transistors; however, in other embodiments, the transistors 412a and 412b may be MOSFET or IGBT transformers.

As configured, there are four PWM signals: PWM1A for transistor 212a and PWM2A for transistor 212b of amplifier 200, and PWM1B for transistor 412a and PWM2B for transistor 412b of switching amplifier 400. Recall that positive state (STATE 1) and negative state (STATE 4) both have one lead wire high 210a or 210b and one lead wire low, so STATE 1 and STATE 4 are not a problem for unbalanced voltage coupling to the cable shield. Instead, the coasting states STATE 2 and STATE 3 may present an issue, since STATE 2 has both leads high and STATE 3 has both leads low. The voltage coupling to the cable shield for these two states is canceled in this embodiment by having switching amplifier 200 in STATE 2 while switching amplifier 400 is in STATE 3, and amplifier 200 in STATE 3 while amplifier 400 is in STATE 2. This is seen for example from the average lead wire voltage for the two wires 210a and 210b from STATE 2 of FIG. 3 and the two wires 210c and 210d in STATE 3 of FIG. 5, said average voltage being 0. This is accomplished by synchronizing the switching amplifier 200 with the switching amplifier 400, with coasting states out of phase with each other. Synchronizing the switching amplifiers 200, 400 is accomplished by synchronizing the PWM signals. This means that switching amplifiers 200 and 400 will execute respective high voltage states STATE 1 or STATE 4 substantially simultaneously. It does not matter if both execute STATE 1, both execute STATE 4, or one executes STATE 1 while the other executes STATE 4, since both of STATE 1 and STATE 4 have the same voltage coupling to the cable shield. Reversing the phase of the coasting states of one switching amplifier 200 or 400 with respect to the other means that one uses coasting state, STATE 2, and the other uses STATE 3, whenever a coasting state is applied. Therefore, in high voltage states and in coasting states, of the four wires 210a-d in the cable, two are generally high and two are generally low, greatly reducing the net voltage coupling to the cable shield.

Synchronizing switching amplifiers 200 and 400, with a coasting state phase reversal on one with respect to the other, mostly eliminates voltage coupling to the cable shield. This may occur when the timing of coasting STATE 2 on one switching amplifier 200 or 400 matches coasting STATE 3 on the other switching amplifier. This timing match is generally imperfect when the switching amplifiers 200, 400 apply different voltages. However, the timing may be substantially matched between the switching amplifiers 200, 400 used for the radial magnetic bearing system 100. As will be appreciated, the switching amplifiers 200, 400 are normally run close to zero output voltage since maximum net output voltages are generally used under conditions of maximum magnetic flux slew rate. This means the switching amplifiers 200, 400 spend most of the time in coasting states STATE 2 and STATE 3, and little time in high-voltage states STATE 1 and STATE 4. Accordingly, most of the time, STATE 2 of one switching amplifier 200 or 400 is canceling STATE 3 of the other switching amplifier in terms of voltage coupling between the lead wires 210a-d and the cable shield. Furthermore, when a high magnetic flux slew rate is requested that calls for high voltage from the switching amplifiers 200, 400, the timing of the coasting states may still be well-matched. This is especially true of coil pairs 206, 406 from opposing sides of the rotor 102, which may be wired in one cable. As noted above, magnetic bearings are often operated in opposing pairs, such that in increase in flux on one electromagnet is accompanied by a decrease in flux on the opposing electromagnet. (This has a benefit for bearing control in that it linearizes the change in force to the change in flux density, which ordinarily in a single unpaired magnet force is proportional to the square of flux density and is therefore non-linear). As a result, the increase in flux density on one electromagnet requires a certain positive voltage from the associated switching amplifier 200 or 400, while precisely the opposite decrease in flux density on the opposing electromagnet requires an equal negative voltage on the other switching amplifier. As a result, one switching amplifier 200 or 400 spends a certain portion of the switching period in positive voltage STATE 1, while the other switching amplifier spends about the same portion of the switching period in the negative voltage STATE 4. Consequently, the remaining portion of the switching period devoted to the coasting states STATE 2 and STATE 3 on the two switching amplifiers 200, 400 also remain nearly equal and overlapped. Therefore if two electromagnets on opposing sides of a radial magnetic bearing have their coils 206, 406 wired in the same shielded cable, and the PWM signals are synchronized with overlapping coasting periods, and each switching amplifier 200 or 400 uses coasting STATE 2 and STATE 3 out of phase with the other amplifier, then two of the four wires 210a-d in the cable will generally be high during the entire switching period, and two wires will be low, mostly canceling out the voltage coupling to the cable shield.

The two switching amplifiers 200, 400 operating the respective coils 206, 406 on opposing sides of a magnetic bearing will have substantially, but not exactly, equal and opposite voltages. That may occurs when parasitic effects are ignored. Parasitic effects include the approximately 1V drop across each device such as transistors 212a-b, 412a-b, and diodes 214c-d (FIG. 2), 414c-d (FIG. 4). Those voltage drops appear in the voltages listed in FIGS. 3 and 5. As a result, the switching amplifier 200, 400 produces slightly lower positive voltage amplitude than negative voltage amplitude. Accordingly a slightly longer amount of time is needed to increase flux density using STATE 1 on one coil 206 or 406 compared to the time to decrease flux density by the same amount on the opposing coil using STATE 4. Parasitic effects also include the resistance of the coils 206, 406 and resistance of the cable, which cause voltage drops. These parasitic effects must be overcome by additional voltage applied by each switching amplifier 200, 400. Such voltages are generally of the same sign, not opposite sign like the dynamic voltages to change the magnet flux. As a result of these parasitic effects, the switching times are shifted between the two switching amplifiers 200, 400, and the coasting states do not perfectly overlap. So there is a short time when one switching amplifier 200 or 400 is in coasting STATE 2 with both wires high (or in coasting STATE 3 with both wires low) while the other amplifier is in high-voltage state (STATE 1 or STATE 4) with one wire high and one wire low. Consequently, there may be moments in each switching cycle when the four wire voltages do not cancel with respect to the cable shield, and EMI may not be 100% eliminated.

Figure 6:
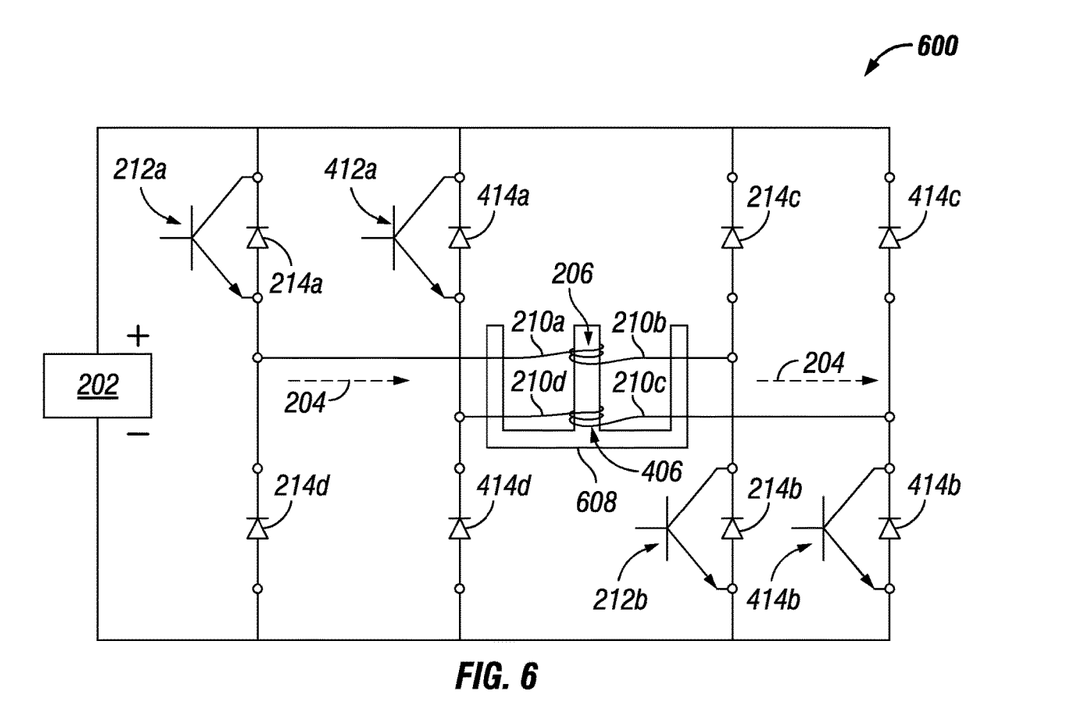
FIG. 6 illustrates a schematic diagram of an exemplary balanced switching amplifier applied to an isolated E-core electromagnet, which may be utilized in the radial magnetic bearing assembly of FIG. 1, according to one or more embodiments of the disclosure.

Referring now to FIG. 6 with continued reference to FIG. 1-5, FIG. 6 illustrates a schematic diagram of an exemplary balanced switching amplifier 600, which may be utilized in the place of one or more of the switching amplifiers 111 in the amplifier array 110 of FIG. 1, according to one or more embodiments of the disclosure. As arranged in FIG. 1, the amplifier array 110 may include four balanced switching amplifiers 600. Each balanced switching amplifier 600 may be electrically coupled to a respective electromagnet 104a-d of the radial magnetic bearing assembly 100 as provided herein. The voltage link 202 may include a positive voltage link and a negative voltage link and may be indicative of DC voltage provided by the power source 112 to the amplifier array 110, and correspondingly, to each of the balanced switching amplifiers 600. Each of the balanced switching amplifiers 600 may be electrically coupled to a plurality of loads, according to one or more embodiments of the disclosure. As illustrated in FIG. 6, the plurality of loads may include the coil 206 and the coil 406, and the balanced switch amplifier 600 may be configured to drive the coils 206 and 406 simultaneously using switching signals provided by the controller 108.

The coils 206 and 406 may each be wound on a magnetic core 608 of the electromagnet (one of 104a-d) of the radial magnetic bearing assembly 100. In an exemplary embodiment, the coils 206, 406 may be electrically isolated from one another. As arranged in FIG. 6, the coils 206, 406 are magnetically coupled and have the same number of turns about the magnetic core 208. In another embodiment, the coils 206, 406 have substantially the same number of turns, where one coil 206 or 406 may have a reduced number of turns in relation to the other coil to accommodate incomplete magnetic coupling related to magnetic flux leakage. The balanced switching amplifier 600 may be electrically coupled with each coil 206, 406 via two lead wires 210*a-d*. Accordingly, an electromagnet (one of 104*a-d*) may be electrically coupled to a respective balanced switching amplifier 600 via four lead wires 210*a-d*.

Magnetic coupling between coils 206 and 406 may have implications for the balanced switching amplifier 600. Magnetic coupling of the coils 206 and 406 means that the coils 206 and 406 surround the same magnetic flux, and therefore the volts-per-turn of the coils 206 and 406 are the same at all times. If there is some flux leakage at the end of the magnet pole, the magnetic flux surrounded by each coil 206 and 406 may differ slightly, giving a slightly different volts-per-turn. The number of turns may be adjusted slightly downward on the outer coil to make the voltage on both coils 206 and 406 the same at all times. Having the same voltage due to magnetic coupling, coils 206 and 406 are operated by synchronized switching signals. Both coils 206 and 406 receive the same positive voltage at the same time, meaning both coils 206 and 406 in STATE 1. Both coils 206 and 406 receive the same negative voltage at the same time, meaning both coils 206 and 406 in STATE 4. Both coils 206 and 406 receive the same coasting voltage at the same time, meaning both coils 206 and 406 in coasting state (STATE 2 or STATE 3). However, it is possible to drive one coil 206 or 406 in with STATE 2 and the other coil in STATE3. By doing so, the average voltage of the lead wires remains at 0V, the same as during positive or negative voltage states.

Figure 7:
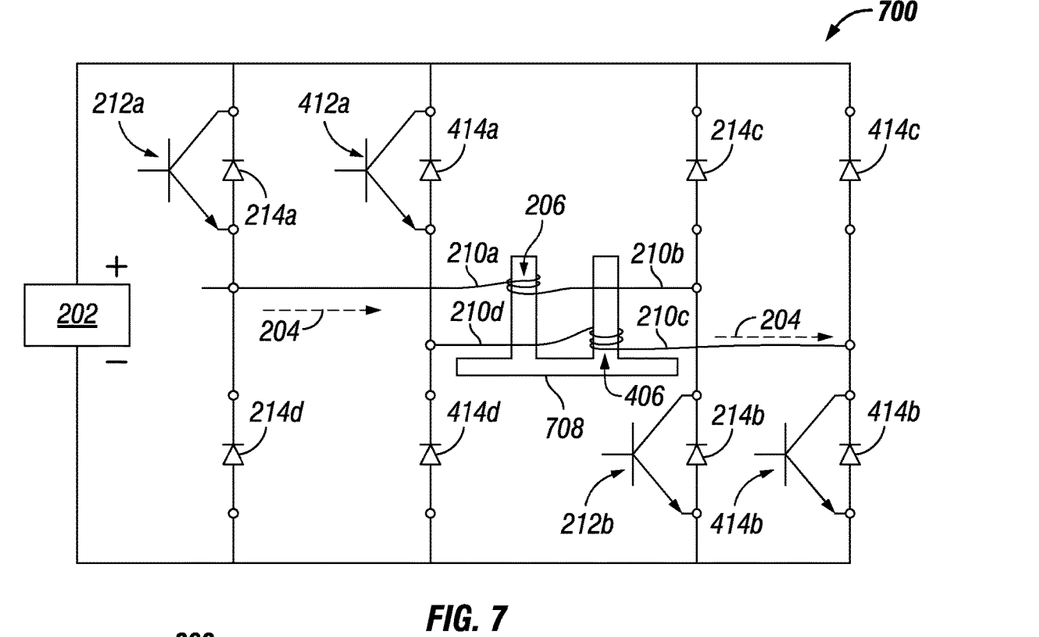
FIG. 7 illustrates a schematic diagram of another exemplary balanced switching amplifier applied to a non-isolated C-core electromagnet, which may be utilized in the radial magnetic bearing assembly of FIG. 1, according to one or more embodiments of the disclosure.

Referring now to FIG. 7 with continued reference to FIGS. 1-6, FIG. 7 illustrates a schematic diagram of another exemplary balanced switching amplifier 700, which may be utilized in the place of one or more of the switching amplifiers 111 in the amplifier array 110 of FIG. 1, according to one or more embodiments of the disclosure. As the balanced switching amplifier 700 is similar in some respects to the balanced switching amplifier 600, like reference numbers may be used to refer to like components. In particular, FIG. 7 illustrates a similar balanced amplifier 700 to the balanced switching amplifier 600 of FIG. 6; however, the balanced switching amplifier 700 may include magnetic core 708 in place of magnetic core 608. Accordingly, instead of both coils 206 and 406 being on one pole of the magnetic core 608, coils 206 and 406 are on adjacent poles of the magnetic core 708, and the back-iron of the electromagnet (one of 104*a-d*) continues to adjacent electromagnets on each side. Although not shown, the back-iron of the stator may continue full circle to connect all electromagnets 104*a-d*. As before, both coils 206 and 406 are synchronized so that the switching times are the same, and both coils 206 and 406 operate simultaneously in positive STATE 1, negative STATE4, or a coasting state. When in a coasting state, one coil 206 or 406 will be in STATE 2 while the other is in STATE 3. Because of this, two of the four lead wires will always be high while the other two are always low, thus eliminating voltage coupling to the cable shield. Accordingly, the balanced switching amplifier 700 of FIG. 7 may be considered similar to the balanced switching amplifier 600 as FIG. 6, but with much reduced magnetic coupling between the coils 206 and 406 due to the back-iron offering an alternate flux path. This eliminates the concern that leakage flux may alter the volts per turn on the two coils 206 and 406. Even though the greatly reduced magnetic coupling does not require absolute matching of the voltages applied to coils 206 and 406, the switching amplifier 700 is still operated that way in order to eliminate electrical coupling to the shield. It should be understood that many different types of electromagnets may be used on magnetic bearings, with E-cores (magnetic core 608) as shown in FIG. 6, C-cores (magnetic core 708) as shown in FIG. 7, and multi-pole cores with windings distributed on several poles. Electromagnets may also be isolated as in FIG. 6, or connected by back-iron (not shown) as in FIG. 7. These standard configurations may be adapted to the balanced switching amplifier 600 or 700 by using two separate coils 206 and 406, which are operated together in a fashion that cancels out the switching voltage coupled to the shield.

Referring again to FIGS. 2 and 4 with continued reference to FIGS. 6 and 7, the respective switching amplifiers 200 and 400 may be switching amplifier sections of the balanced switching amplifier 600 of FIG. 6, according to one or more embodiments of the disclosure. In another embodiment, the respective switching amplifiers 200 and 400 may be switching amplifier sections of the balanced switching amplifier 700 of FIG. 7. In particular, FIG. 2 illustrates one pair of transistors 212*a*, 212*b* operating as a switching amplifier section with respect to the coil 206, and FIG. 4 illustrates the other pair of transistors 412*a*, 412*b* operating as a switching amplifier section with respect to the coil 406. The four transistors 212*a*, 212*b*, 412*a*, and 412*b* may be configured in groupings or pairs of transistors 212*a*, 212*b* and 412*a*, 412*b* to operate as two separate switching amplifiers 200, 400 (see FIGS. 2 and 4) operating in tandem as two sections of a balanced switching amplifier 600, 700 to drive the coils 206 and 406 of the same electromagnet (one of 104*a-d*). Each switching amplifier section 200, 400 of the balanced switching amplifier 600, 700 may be constructed in the form of an asymmetric half bridge circuit.

Generally, the transistors 212*a*, 212*b* and 412*a*, 412*b* of the switching amplifiers 200, 400 may be driven by output signals, e.g., pulse width modulation (PWM) signals, generated by a processor 114 of the controller 108. The controller 108 may be an analog controller or a digital controller. In at least one embodiment, the processor 114 may be or may include a field programmable gate array (FPGA) generating two PWM signals, where the FPGA provides a PWM signal PWM1A to the transistor 212*a* and another PWM signal PWM2A to the transistor 212*b* of the switching amplifier 200 in FIG. 2. The transistors 412*a* and 412*b* of the switching amplifier section of FIG. 4 may be driven by the PWM signals PWM1B and PWM2B. In one or more embodiments, the PWM signal PWM1B is equivalent to the PWM signal PWM2A, and the PWM signal PWM2B is equivalent to the PWM signal PWM1A. The upper transistor 412*a* of the switching amplifier section 400 and the lower transistor 212*b* of amplifier section 200 are provided with the same PWM signal (PWM1B=PWM2A). Lower transistor 412*b* of the switching amplifier section 400 and the upper transistor 212*a* of amplifier section 200 are provided with the same PWM signal (PWM2B=PWM1A). Thus the PWM signals provided to the upper and lower transistors 412*a* and 412*b* of the switching amplifier section 400 are swapped with respect to the PWM signals provided to the upper and lower transistors 212*a* and 212*b* of the switching amplifier section 200. As a result, whenever one amplifier section 200 is in coasting STATE 2, the other amplifier section 400 is in coasting STATE 3. Likewise whenever amplifier section 200 is in coasting STATE 3, the other amplifier section 400 is in coasting STATE 2. Positive voltage STATE 1 occurs simultaneously on both amplifier sections 200 and 400, so both of the coils 206 and 206 have the same positive voltage as may be required by their mutual magnetic coupling. Negative voltage STATE 4 occurs simultaneously on both amplifier sections 200 and 400, so both of the coils 206 and 406 have the same negative voltage as may be required by their mutual magnetic coupling. And when one amplifier section 200 or 400 is in coasting STATE 2 and the other in coasting STATE 3, both of the coils 206 and 406 have the same −2V as may be required by their mutual magnetic coupling. Thus the two-section balanced switching amplifier 600, 700 is functionally equivalent to a one-section unbalanced switching amplifier, operated with two PWM signals and controlling one electromagnet, except that it uses four lead wires 210a-d instead of two, and those lead wires have no net voltage coupling to the cable shield, thus greatly reducing EMI.

Accordingly, the balanced switching amplifier 600, 700 may include one switching amplifier section 400 with the PWM signals swapped relative to the other switching amplifier section 200, such that the switching amplifier 200 uses a coasting state with the "high" transistor 212a turned on (STATE 2) while the other switching amplifier 400 uses a coasting state with the "low" transistor 412a turned on (STATE 3). Therefore, at all times and in all states the voltage on two of the lead wires 210a-d are at positive voltage link while the voltage on the other two of the lead wires 210a-d are at negative voltage link, such that switching voltages on the four lead wires 210a-d substantially cancel out, thus reducing conducted emissions to ground, and also reducing radiated emissions from a cable shield (see FIG. 9) surrounding each of the lead wires 210a-d. Further, as arranged, each of the switching amplifiers 200, 400 may have identical STATE 1 and STATE 4 timing, so the volts-per-turn on both of the coils 206 and 406 match, and the coupled amplifier outputs are not in conflict, and two of the lead wires 210a-d may be at a positive voltage link and two of the lead wires 210a-d may be at a negative voltage link.

Accordingly, the balanced switching amplifier 600, 700, including amplifier sections 200 and 400, may be utilized as the switching amplifiers 111 in amplifier array 110. By using the exact same switching timing in the two amplifier sections 200 and 400 (due to sharing the same two PWM signals), with phase shifting between coasting states (STATE 2 and STATE 3) on the two amplifier sections 200 and 400 (due to the swap of the PWM signals), the four lead wires 210a-d always maintain a neutral voltage coupling to the cable shield.

Figure 8:
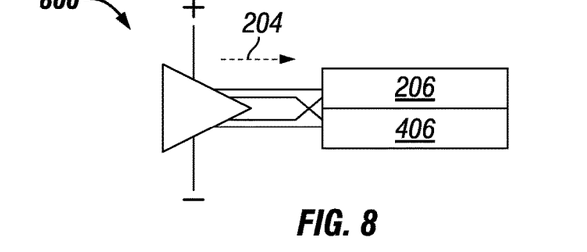
FIG. 8 illustrates a symbolic representation of the schematic diagram of FIG. 6, according to one or more embodiments of the disclosure.
Figure 9:
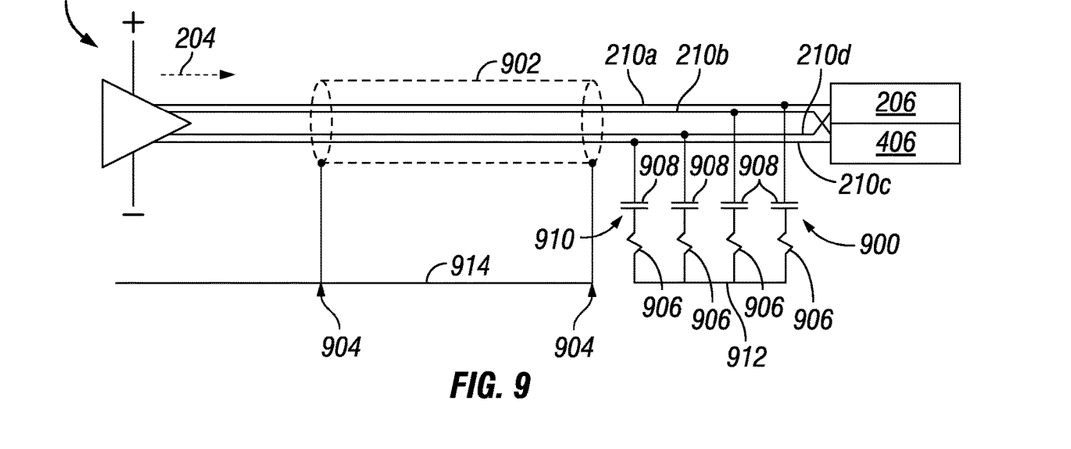
FIG. 9 illustrates a schematic of a snubber circuit coupled to the symbolic representation of the schematic diagram of FIG. 6, according to one or more embodiments of the disclosure.

Referring now to FIGS. 8 and 9 with continued reference to the preceding figures, FIG. 8 illustrates a symbolic representation 800 of the schematic diagram of FIG. 6, and FIG. 9 illustrates a schematic of a snubber circuit 900 coupled to the balanced switching amplifier 600 via the symbolic representation 900 illustrated in FIG. 8, according to one or more embodiments of the disclosure. In an embodiment, a cable shield 902 may surround all four lead wires 210a-d of the balanced switching amplifier 200. The cable shield 902 may include one or more grounded connections (two shown 904) along an axial extent thereof. In an embodiment, all of the lead wires 210a-d may have identical voltage coupling to the cable shield 902 due to the cable construction, and symmetrical coupling to each other. As illustrated, the snubber circuit 900 may be coupled to each of the four lead wires 210a-d at the load end of the shielded cable 902. In addition, in one or more embodiments, the snubber circuit 900 may be coupled to each of the four lead wires 210a-d at the coil end of the cable and/or at intermediate points of the cable.

The snubber circuit 900 may include a plurality of resistors 906 and capacitors 908 arranged in an R-C network 910 with a common node 912 that may be, or in other embodiments may not be, tied to ground 914 or back to the power source 112. The snubber circuits damp out voltage overshoot on each lead wire 210a-d due to transmission line effects. The common node 912 of the snubber circuit 900 (i.e., where the R-C 906, 908 of the snubber circuit 900 tie together) may see two R-C connections to the negative voltage link and two R-C connections to the positive voltage link, at any moment of the switching cycle. Thus the common node 912 is balanced with respect to the switching voltages, and does not have a ground connection in some embodiments. Although not illustrated, it will be appreciated that the common node 912 of the snubber circuit 900 may be tied to a return line to ground 914 or to the power source 112. This return line, if used, may run within the same shielded cable as the lead wires 210a-d.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim:

1. A balanced switching amplifier for a magnetic bearing assembly, comprising:
   a voltage link configured to receive a voltage from a power source;
   a first switching amplifier configured to drive a first load of an electromagnet of the magnetic bearing assembly via a first plurality of lead wires, the first switching amplifier comprising
      a first switch electrically coupled to a positive voltage side of the voltage link; and
      a second switch electrically coupled to a negative voltage side of the voltage link, wherein the first switch and the second switch are configured to output four distinct output states for the first switching amplifier; and
   a second switching amplifier configured to drive a second load of the electromagnet via a second plurality of lead wires, the second switching amplifier comprising
      a third switch electrically coupled to the positive voltage side of the voltage link; and
      a fourth switch electrically coupled to the negative voltage side of the voltage link, wherein the third switch and the fourth switch are configured to output four distinct output states for the second switching amplifier,
   wherein the first switching amplifier and the second switching amplifier are configured to operate in tandem such that respective voltages in the first plurality of lead wires and the second plurality of lead wires substantially neutralize one another, thereby reducing electromagnetic emissions from each of the first plurality of lead wires and the second plurality of lead wires.

2. The balanced switching amplifier of claim 1, wherein each of the first switch, the second switch, the third switch, and the fourth switch is a transistor, the transistor selected from the group consisting of a NPN transistor, a MOSFET transistor, and a IGBT transistor.

3. The balanced switching amplifier of claim 1, wherein each of the first switching amplifier and the second switching amplifier is arranged in the form of an asymmetric half bridge circuit.

4. The balanced switching amplifier of claim 1, wherein the first load is a first coil wound about a core of the electromagnet, and the second load is a second coil wound about the core of the electromagnet, the first coil and the second coil being isolated from one another as wound about the core.

5. The balanced switching amplifier of claim 4, wherein the core of the electromagnet is an E-shaped core, and each of the first and second coils is disposed on one pole of the E-shaped core.

6. The balanced switching amplifier of claim 4, wherein the core of the electromagnet is a C-shaped core, and the first and second coils are disposed on respective poles of the C-shaped core.

7. A magnetic bearing assembly for a rotating machine, comprising:
a rotor configured to rotate with a rotary shaft of the rotating machine;
a plurality of electromagnets disposed about the rotor, each electromagnet comprising a first coil and a second coil spaced from the first coil;
a plurality of balanced switching amplifiers, each balanced switching amplifier electrically coupled to a respective electromagnet via four lead wires, wherein two lead wires of the four lead wires are electrically coupled to the first coil and two other lead wires of the four lead wires are electrically coupled to the second coil;
a plurality of sensors configured to measure at least one of an axial position and a radial position of the rotor, each sensor further configured to generate and transmit an input signal including information related to a measured position of the rotor;
a controller configured to receive the respective input signal from each of the sensors, compare the respective received input signal with a first reference signal and a second reference signal, generate a first output signal and a second output signal based on a comparison of the respective received input signal with the first reference signal and the second reference signal, and transmit the first output signal and the second output signal to the respective balanced switching amplifier of the plurality of balanced switching amplifiers; and
a power source electrically coupled to and configured to power at least the plurality of balanced switching amplifiers, wherein each balanced switching amplifier comprises:
a voltage link receiving a voltage from the power source and configured to provide a positive voltage link and a negative voltage link;
a first switching amplifier electrically coupled to the first coil of the electromagnet via the first two lead wires, the first switching amplifier comprising
a first switch electrically coupled to the positive voltage link; and
a second switch electrically coupled to the negative voltage link, wherein the first switch and the second switch are configured to output four distinct output states for the first switching amplifier; and
a second switching amplifier electrically coupled to the second coil of the electromagnet via the two other lead wires, the second switching amplifier comprising
a third switch electrically coupled to the positive voltage link; and
a fourth switch electrically coupled to the negative voltage link, wherein the third switch and the fourth switch are configured to output four distinct output states for the second switching amplifier,
wherein the first switching amplifier and the second switching amplifier are configured to operate in tandem such that respective voltages in the two lead wires and the two other lead wires substantially neutralize one another, thereby reducing electromagnetic emissions from each of the four lead wires.

8. The magnetic bearing assembly of claim 7, wherein:
each of the first switch, the second switch, the third switch, and the fourth switch is a transistor, the transistor selected from the group consisting of a NPN transistor, a MOSFET transistor, and a IGBT transistor; and
the first output signal is a first pulse width modulation signal and the second output signal is a second pulse width modulation signal distinct from the first pulse width modulation signal.

9. The magnetic bearing assembly of claim 8, wherein the balanced switching amplifier is electrically coupled to the controller, such that the first transistor is configured to receive the first pulse width modulation signal, the second transistor is configured to receive the second pulse width modulation signal, the third transistor is configured to receive the second pulse width modulation signal, and the fourth transistor is configured to receive the first pulse width modulation signal.

10. The magnetic bearing assembly of claim 7, wherein the controller comprises a processor, the processor being a field programmable gate array.

11. The magnetic bearing assembly of claim 7, further comprising a snubber circuit electrically coupled to the four lead wires of the balanced switching amplifier, the snubber circuit comprising a resistor-capacitor network having a common node tied to ground or to the power source.

12. The magnetic bearing assembly of claim 7, wherein:
the plurality of electromagnets comprises four electromagnets arranged equiangularly about the rotor; and
the first coil and the second coil of at least one electromagnet have the same number of turns.

13. The magnetic bearing assembly of claim 7, wherein:
the first coil is wound about a core of the electromagnet, and the second coil is wound about the core of the electromagnet; and
the core of the electromagnet is an E-shaped core, and each of the first and second coils is disposed on one pole of the E-shaped core.

14. The magnetic bearing assembly of claim 7, wherein:
the first coil is wound about a core of the electromagnet, and the second coil is wound about the core of the electromagnet; and
the core of the electromagnet is a C-shaped core, and the first and second coils are disposed on respective poles of the C-shaped core.

15. The magnetic bearing assembly of claim 7, wherein each of the four lead wires are disposed in a shielded cable and have equal voltage coupling.

16. The magnetic bearing assembly of claim 7, wherein the power source is further electrically coupled to the controller, the plurality of sensors, or both the controller and the plurality of sensors.

17. A magnetic bearing assembly for a rotating machine, comprising:
- a rotor configured to rotate with a rotary shaft of the rotating machine;
- a plurality of electromagnets disposed about the rotor and comprising a first electromagnet comprising a first coil and a second electromagnet radially opposing the first electromagnet and comprising a second coil;
- a plurality of switching amplifiers configured to operate in synchrony with one another, the plurality of switching amplifiers comprising a first switching amplifier electrically coupled to the first coil of the first electromagnet via two lead wires, and a second switching amplifier electrically coupled to the second coil of the second electromagnet via two other lead wires;
- a plurality of sensors configured to measure at least one of an axial position and a radial position of the rotor, each sensor further configured to generate and transmit an input signal including information related to a measured position of the rotor;
- a controller configured to receive the respective input signal from each of the sensors, compare the respective received input signal with a first reference signal and a second reference signal, generate a first output signal and a second output signal based on a comparison of the respective received input signal with the first reference signal and the second reference signal, and transmit the first output signal to the first switching amplifier and the second output signal to the second switching amplifier of the plurality of switching amplifiers; and
- a power source electrically coupled to and configured to power at least the plurality of switching amplifiers, wherein:
- the first switching amplifier and the second switching amplifier each comprises a voltage link receiving a voltage from the power source and configured to provide a positive voltage link and a negative voltage link;
- the first switching amplifier comprises
  - a first switch electrically coupled to the positive voltage link; and
  - a second switch electrically coupled to the negative voltage link, wherein the first switch and the second switch are configured to output four distinct output states for the first switching amplifier;
- the second switching amplifier comprises
  - a third switch electrically coupled to the positive voltage link; and
  - a fourth switch electrically coupled to the negative voltage link, wherein the third switch and the fourth switch are configured to output four distinct output states for the second switching amplifier; and
- the first switching amplifier and the second switching amplifier are configured to operate in tandem such that respective voltages in the two lead wires and the two other lead wires substantially neutralize one another, thereby reducing electromagnetic emissions from each of the four lead wires.

18. The magnetic bearing assembly of claim 17, wherein:
- each of the four lead wires are disposed in a shielded cable;
- the first output signal is a first pulse width modulation signal and the second output signal is a second pulse width modulation signal distinct from the first pulse width modulation signal; and
- the respective voltages in the two lead wires and the two other lead wires are out of phase with one another in at least two of the four distinct output states for the first switching amplifier and the second switching amplifier.

* * * * *